April 3, 1934.                R. H. PARK                1,953,830
                               DRILL CHUCK
                            Filed Oct. 13, 1933
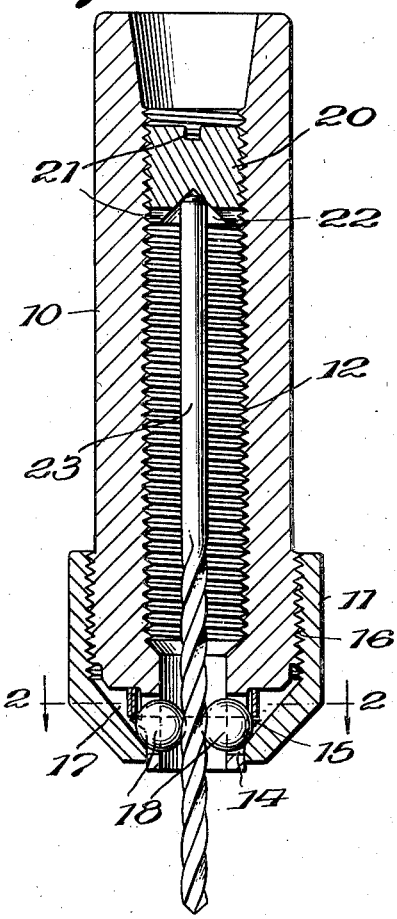
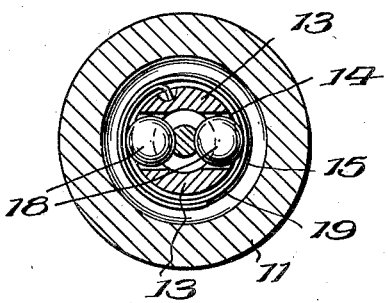
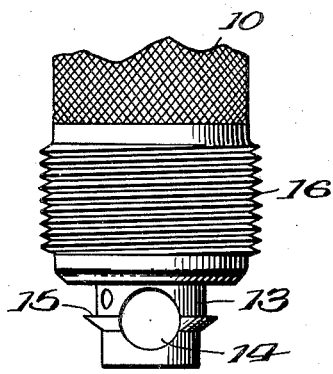
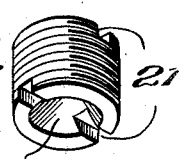
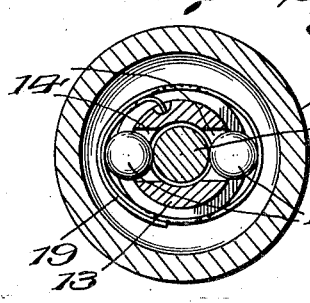
Inventor
Robert H. Park,
Bernard F. Garvey
By
Attorney

Patented Apr. 3, 1934

1,953,830

UNITED STATES PATENT OFFICE

1,953,830

DRILL CHUCK

Robert H. Park, Seattle, Wash.

Application October 13, 1933, Serial No. 693,499

5 Claims. (Cl. 279—22)

The present invention relates to drill chucks, especially of the type adapted for use with fragmentary portions of fluted drills which are usually discarded.

It is, of course, well known in this art to provide drill chucks adapted to secure drills from displacement, including various structural improvements for centering the drill, permitting re-use of broken drills, etc., and it is consequently the purport of the present invention only to provide a more efficient chuck of this character which augments the uses and advantages of chucks already in the art.

Of especial importance in the present invention is the provision of a chuck which employs spherical drill engaging elements arranged to engage the flutes of the drill to positively hold the latter from lateral displacement, regardless of the diameter of the drill used, yet permitting expeditious engagement and disengagement of the drill at the option of the user.

A conspicuous disadvantage in chucks of present day manufacture is the tendency to render the chuck prematurely unsuitable for use, by reason of fragments of the material, loosened from the work operated on by the drill, finding their way into the chuck collet. The present invention eliminates this disadvantage by so constructing the chuck body or drill holder that a portion thereof at all times protrudes beyond the collet in concentric relation to the drill to seal the drill-holding end of the chuck against the entrance of foreign materials therethrough.

It is a coordinate object of the present invention to provide spherical detents which are yieldably engaged in the flutes of the drill, the yieldable means being permitted to engage the detents only at a point above their centers of gravity to urge the detents, in conjunction with a collet of especial construction, positively into engagement with the drill at all times.

A still further object of the invention is to equip the chuck or drill holder with a follower screw which is adjustably mounted in the chuck and operable through either end of the latter by a screw driver or like instrument, without disengaging the collet, or any other part of the chuck assembly.

Other objects of the invention will be apparent from the following description of the present preferred form thereof, taken in connection with the accompanying drawing, wherein Fig. 1 is a longitudinal sectional view of a drill chuck, constructed in accordance with the present invention, illustrating the application of the same with a small size fluted drill;

Fig. 2 is a horizontal sectional view, taken on the line 2—2 of Fig. 1, looking in the direction of the arrows;

Fig. 3 is a detail fragmentary side elevational view of the drill chuck body, showing to advantage the reduced lower end of the body;

Fig. 4 is a perspective view of the follower screw used in the body of the chuck; and Fig. 5 is a horizontal sectional view taken through the drill chuck, illustrating to advantage the position assumed by the spherical detents and the restraining spring when a large size drill is being engaged in the chuck.

The device of the present invention includes a chuck assembly generally designated 9, which consists of a cylindrical body 10 and a collet 11. The body 10 is provided with a threaded bore 12, the threads terminating short of the opposite ends of the body as illustrated to advantage in Fig. 1. The lower end of the body is reduced as indicated at 13, which is provided on opposite sides thereof with circular openings 14. Intermediate the ends of the reduced portion the outer periphery of the latter is formed to provide an annular flange 15, the upper face of which is abrupt and the lower face bevelled or inclined. The chuck body is provided with external screw threads 16, adjacent its lower end in proximity to the reduced portion 13. These threads complement corresponding threads formed on the inner periphery of the collet 11. Preferably the collet 11 is circular in cross-section, the lower end of which issues into a truncated cone-shaped terminal to provide an abruptly inclined inner wall 17, which circumscribes the inner end of the reduced portion 13.

Spherical detents 18 are mounted in the openings 14, the aggregate diameter of the detents being in excess of the diameter of the reduced portion 13 of the body, so that portions of the detents will at all times project beyond the outer periphery of the housing. Normally the detents are urged into engagement with each other, under the influence of a restraining contractile spring 19. Preferably the spring 19 is anchored on the reduced portion between the annular flange 15 and the inner terminal of the chuck body 10. The spring at all times abuts said inner terminal of the chuck body and contacts the spherical detents only at a point above the center of gravity of the latter when the chuck is in use. Consequently, the detents are normally urged inwardly and downwardly against the lower walls of the openings 14.

Adjustably mounted in the threaded bore 12 of the chuck body is a follower screw 20, the opposite ends of which are provided with kerfs 21 adapted for the reception of a screw driver or like instrument, by which the screw is operated in the body. The inner end of the screw is provided with a conoidal recess 22, which receives the butt end of a drill 23. The chuck assembly of the present invention is adapted for use with a fluted drill and consequently, for purposes of illustration, I have in the drawing, shown a full length drill of this type. Where a full length drill is used, the screw 20 is approximately in the position shown in Fig. 1 of the drawing. Where, however, a fragment of a drill is used, the screw 20 may be moved to any point in the chuck body, which permits a sufficient portion of the drill to project beyond the collet for engagement with the work.

In inserting a small drill, the butt end may be urged into the reduced portion 13 of the chuck body at the side of the detents 18 until said butt end makes contact with the screw 20, after which the outer end of the drill is moved laterally until it is intercepted by the detents. The collet which, during this operation, has been released sufficiently to permit the insertion of the drill, is then threaded on the chuck body to urge the detents inwardly against the drill flutes. By reason of the provision of the conoidal recess 22 in the screw 20 in conjunction with the spherical detents, the drill is positively held centrally in the chuck body, as shown in Fig. 1 of the drawing. In engaging a drill of larger diameter in the chuck body, as illustrated in Fig. 5 of the drawing, after the collet has been sufficiently released, the butt end of the drill is urged into the reduced portion 13, which causes the detents 18 to move outwardly through the openings 14, against the resistance of the spring 19. This action expands the spring into the shape of an ellipse, as also shown in Fig. 5. The detents then flex into the flutes of the drill under the contractile action of the spring 19 and the collet is threaded tightly on the chuck body. When it is desired to adjust the screw 20 through the drill engaging end of the chuck body, a screw driver or like instrument is inserted between the detents 18 and in the kerf 21 formed on the inner end of the screw, and adjustment of the latter consummated in a manifest manner.

It is to be understood, of course, that although I have herein described the preferred form of my invention, various changes may be made in the construction, proportion and arrangement of parts, within the scope of the claims hereto appended.

What is claimed is:

1. A drill chuck including a drill carrying body equipped with a collet having an abruptly inclined wall at one end, spherical detents mounted in said body for engagement with the drill, means for yieldably urging the detents against the drill, said means being positioned eccentrically to the detents to urge the latter against the inclined inner wall of the collet.

2. A drill chuck including, in combination with a fluted drill, a body bored for the reception of said drill and having one end reduced and equipped with spherical detents in the wall thereof for normal engagement with each other in said bore, a collet adjustably mounted on said body for engagement with said detents, and means on the reduced end of the body to constantly urge the detents toward each other, the detents being separable during insertion of the drill and automatically engageable in the drill flutes by action of said means.

3. A drill chuck including a chuck assembly consisting of a body, one end of which is reduced a collet adjustably mounted on the body, spherical detents mounted in the wall of the reduced portion for engagement with each other, the combined diameters of which are in excess of the diameter of the reduced portion to protrude beyond the outer periphery of the latter, and means on the reduced portion for continuous engagement with the protruding portions of the detents to normally urge the latter into engagement with each other.

4. A drill chuck including a chuck assembly consisting of a body, one end of which is reduced, spherical detents mounted in the reduced end of the body, portions of which protrude beyond the outer periphery of the latter, a restraining spring, one margin of which is in engagement with the chuck body and the opposite margin of which engages the detents beyond the horizontal axes of the latter to normally urge the detents away from the chuck body and into engagement with each other, said detents being movable under pressure within the confines of said spring and against the resistance of the latter sufficiently to accommodate a drill of any cross-sectional dimension capable of introduction into the reduced portion of the chuck body.

5. A drill chuck including a body, one end of which is reduced with openings formed in opposite sides thereof, spherical detents mounted in said openings, portions of which protrude beyond the outer periphery of the reduced portion of the body, a flat spring coiled around the outer periphery of said reduced portion in engagement with the lower terminal of the chuck body and contacting the detents to urge the latter against the outer walls of said openings, and a collet adjustably mounted on said body and engageable with said detents to force the latter into locking engagement with a drill inserted into the body.

ROBERT H. PARK.